United States Patent [19]

Fisher et al.

[11] Patent Number: 4,478,175
[45] Date of Patent: Oct. 23, 1984

[54] REARING UNIT

[75] Inventors: John Fisher, Northwich; David Holman, Nantwich, both of England

[73] Assignee: BP Nutrition (UK) Limited, Essex, England

[21] Appl. No.: 550,932

[22] Filed: Nov. 10, 1983

Related U.S. Application Data

[63] Continuation of Ser. No. 338,296, Jan. 11, 1982.

[30] Foreign Application Priority Data

Jan. 14, 1981 [GB] United Kingdom ............ 8101044
Jun. 30, 1981 [GB] United Kingdom ............ 8120157
Aug. 21, 1981 [GB] United Kingdom ............ 8125548

[51] Int. Cl.³ .............................................. A01K 1/02
[52] U.S. Cl. ........................................ 119/16; 119/20
[58] Field of Search ............... 119/16, 18, 20, 31, 119/32, 71

[56] References Cited

U.S. PATENT DOCUMENTS

| | | | |
|---|---|---|---|
| 394,955 | 12/1888 | Butler | 119/71 |
| 2,627,841 | 2/1953 | Johnson | 119/31 |
| 2,628,590 | 2/1953 | Wood | 119/32 |
| 2,661,800 | 12/1953 | Reichenbach | 119/18 |
| 2,732,826 | 1/1956 | Dawson | 119/20 |
| 2,881,733 | 4/1959 | Young, Jr. et al. | 119/31 X |
| 3,550,558 | 12/1970 | Sachs | 119/15 |
| 3,995,592 | 12/1976 | Goldstaub et al. | 119/16 |
| 4,173,947 | 11/1979 | Whiteside, Jr. | 119/20 |
| 4,269,146 | 5/1981 | Lindenman | 119/16 |

FOREIGN PATENT DOCUMENTS

| | | | |
|---|---|---|---|
| 1191623 | 4/1965 | Fed. Rep. of Germany | 119/18 |
| 807533 | 1/1959 | United Kingdom | 119/18 |

Primary Examiner—Hugh R. Chamblee
Attorney, Agent, or Firm—Brooks, Haidt, Haffner & Delahunty

[57] ABSTRACT

A rearing unit, suitable for piglets, has a heated nest box with openable roof, a pen in communication with the nest box having a perforated floor, a liquid feeding device in the pen having one or more artificial nipples and a solids feed device.

The nest box temperature may be thermostatically controlled by a sensor below a perforated floor of the nest box.

The unit may be constructed from a slotted framework and boards, the boards being sealed in the slots by an adhesive or inert water-repellant sealant.

The unit may house very young piglets up to a weight of from 5 to 8 kg. At that weight, they may then be transferred to a similar unit with a larger nest box until they weigh from 10 to 15 kg.

7 Claims, 6 Drawing Figures

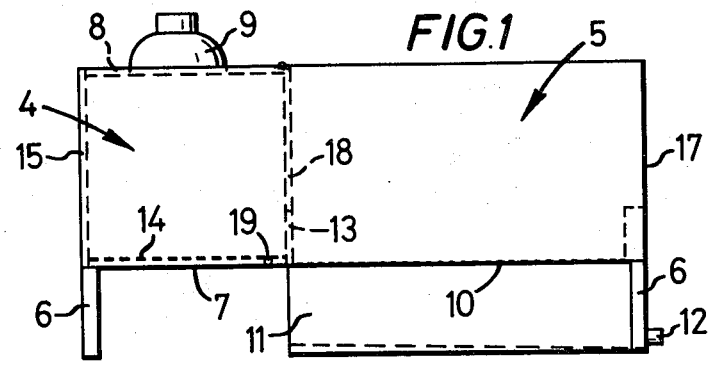
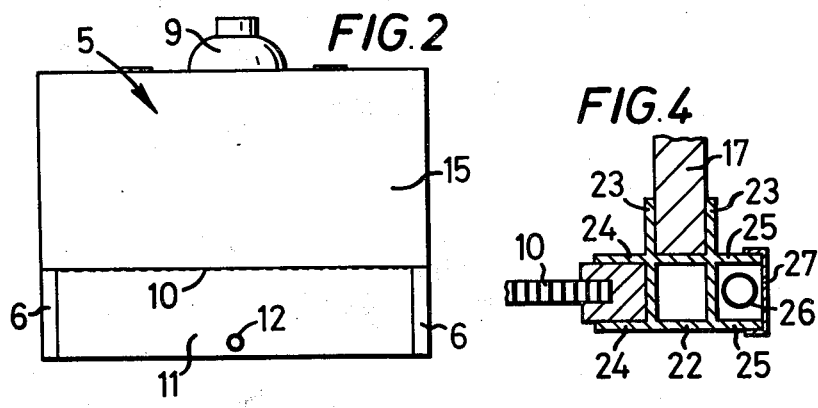
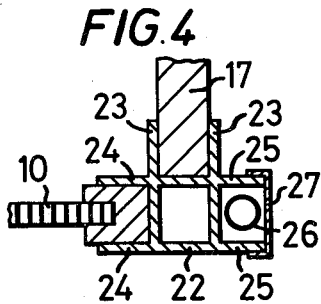
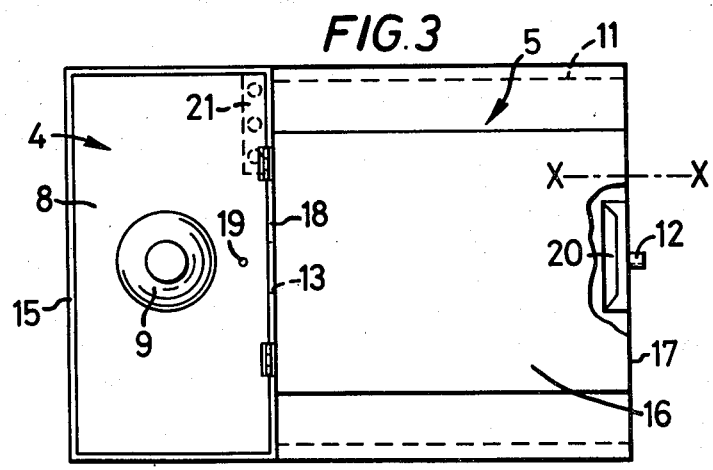

REARING UNIT

This application is a continuation of application Ser. No. 338,296, filed Jan. 11, 1982.

This invention relates to a rearing unit for young pigs.

It is recognised that the productivity of pig farms can be increased if piglets are removed from the sow at the earliest practicable age. Various proposals for the early weaning of piglets have been made and an age of 14 days is a particularly appropriate age for such early weaning. In addition, arrangements have sometimes to be made for the artificial feeding of orphaned piglets or some piglets from very large litters.

Various rearing pens are available for young pigs, but such pens are not suitable for very young pigs with weights which may be as low as 3–4 kg and which are not yet capable of surviving on solid food only.

The present invention is concerned with a unit which has all the necessary equipment for rearing piglets from a very early age and which assists in early weaning.

According to the present invention, a rearing unit suitable for piglets comprises:

(a) a nest box having a heater to maintain a minimum temperature, and an openable roof, (b) a pen in communication with the nest box having a perforated floor, (c) a liquid feeding device in the pen having one or more artificial nipples, and (d) a solids feed device The nest box is preferably maintained at a temperature of from 23° to 28° C. by one or more heaters which may be heat lamps fixed to the roof of the box. It has been found that thermostatic control of the temperature is desirable. This obviates the need for careful control of the macro-environment in which the rearing unit is situated (e.g. the pig rearing shed or building) and allows the units to be used in a variety of situations. It further obviates the need for constant personal supervision of the unit. It has also been found that the position of the temperature sensor in the nest box is important.

In another aspect, therefore, the present invention comprises a pig rearing unit as described above having a thermostatically controlled nest box in which the sensor for the thermostatic control is positioned below a perforated floor of the nest box.

The nest box floor may be of perforated metal or plastic with an air gap between it and the base of the unit, which is solid. The sensor may be fixed to the perforated floor or the solid base as convenient. The air gap may be from ½ to 2 inches depending on the age of the piglets, a smaller gap being used for younger piglets.

The position of the sensor in the nest box is also important. Preferably it is positioned at an intermediate point between the walls and the centre of the box and most preferably also adjacent to the opening between the nest box and the pen. Assuming the heater is fixed centrally in the roof of the nest box this means that the sensor will be in the radiation area of the heater but not directly below it. Being close to the opening in the pen it will also be in a cooler part of the nest box. If the piglets are not in the nest box then the sensor functions by measuring the air temperature at floor level and regulates the heater accordingly.

However, if the piglets are in the nest box, it has been found that they tend initially to sleep away from the opening, i.e. against the corners and sides farthest from the pen. While they are doing this the sensor will be directly exposed to the heater and will not be exposed to the body heat of the piglets. As the box warms up the piglets tend to move nearer the opening until eventually a piglet will be directly above the sensor. The sensor then responds to the body heat of the piglet by switching off, or lowering the heat output of, the heater. As the nest box cools the piglets will move again to the back of the nest box thereby actuating the heater again.

With the sensor below the floor therefore, the thermostatic control functions not merely by direct measurement of the air temperature but also by measurement of the body heat of the piglets and their pattern of sleeping behaviour.

The sensor may also actuate a fan which may be set into a wall of the nest box. In temperature climates control of ventilation may be achieved by having a manually openable roof for the nest box or a manual ventilation slide but this may be insufficient in hot climates or in summer in temperature climates. The fan may be actuated by the sensor to switch on when the heater is switched off, or there may be a limited overlap. The fan may also be actuated by a humidity sensor in addition to, or alternatively to, the temperature sensor so that conditions in the nest box do not become too humid.

The roof of the nest box may, as previously stated, be openable and it is also preferably insulated to limit heat loss. Suitable materials for the roof are, therefore, polystyrene or polyurethane foam sandwiched between suitable plastic or plastic-coated wooden panels. The thickness may be from ½ to 2½ inches.

The base of the pen may also be insulated as may the walls, but it has been found that insulation of the roof is the most important factor in limiting heat loss.

The base of the nest box may, if desired, be in the form of a tray with a drain or in the form of a removable tray. It has been found that healthy piglets do not normally foul a nest box, but there may sometimes be involuntary fouling, so making some provision for cleaning desirable.

A solids feed device of the type generally known as a "creep feeder" may be used to encourage weaning of the piglets. It may be placed in the nest box (e.g. against a wall or across a corner nearest to the pen) to reduce the risk of fouling of the feed and encourage feeding. It may, however, be in the pen if desired. The trough of the feeder may be partially covered, further to reduce the risk of fouling and scattering of the feed. Thus a rectangular trough may be used in the nest box or pen, having a cover with a number of circular holes in it (e.g. three holes of 2 inch diameter). Alternatively, a circular creep feeder may be used in the pen, preferably fixed and in the centre of the pen, with, again, a cover having a number of circular holes in it. The feed may be any of the known pig starter diets.

The pen is desirably also kept at a relatively constant temperature, lower than that of the nest box (e.g. 15° to 20° C.) and this may be maintained by thermostatic or manual control. The pen, in normal climates and conditions, does not need to have a roof and such an open pen allows for easy access to the piglets. However, the pen may have a insulated roof which can be manually placed on flanges on the walls of the pen in cold weather. The insulation may be as for the insulated nest box roof but the pen roof should not extend across the full width of the pen thus ensuring that ventilation is maintained. The roof should, however, cover the liquid feeding device and the opening between nest box and pen.

The perforated floor of the pen allows excreta to pass through onto a suitable slurry collecting receptacle positioned underneath. The unit may be on legs to a suitable height to accommodate the receptacle.

The slurry collecting receptacle may have a slope on it down to a drain. The angle of the slope may vary from 1° to 10° depending on whether a farmer wishes to collect urine and faeces separately or not. A small slope allows urine only to drain naturally with the faeces being collectable separately, e.g. by periodic hosing. A steep slope encourages natural collection of both faeces and urine by gravity.

A drain pipe may be push fitted into a collar extending through a hole in the slurry collecting receptacle to allow easy connection from the pen to a central collecting point, to allow easy cleaning of the drain if necessary, and to allow separate collection of urine and faeces if required.

The opening between nest box and pen may be of limited size, sufficient to allow easy access, but not to give too much heat loss from the nest box. A suitable size may be 10 to 12 inches wide and 10 to 12 inches high. It may have a vertically sliding door so that the piglets can be contained in either the nest box or pen when required.

The liquid feeding device may comprise one or more artificial nipples with a trough below. A particularly suitable device is described in UK Patent Application Nos. 8101045 and 8120158. The contents of those applications are herein incorporated in the present Application by reference.

The dimensions of the unit and its individual components will depend on the number of piglets to be accommodated. A convenient size of unit may be one to hold 20 piglets, in which case suitable dimensions may be:

Nest box 2 ft long by 4 ft wide by 2 ft high
Pen 4 ft long by 4 ft wide by 2 ft high
Nest box opening 11 inches by 11 inches
Liquid feed device 2 nipples
Wattage of nest box heater 50 to 500 watts
Temperature of nest box 23° to 28° C.
Positions of sensor—4 inches in from opening on centre line of opening Such a unit would be capable of rearing the young of 25 sows given proper control of the timing of conception and farrowing.

Units may be produced singly, or in any combination of units with appropriate common walls and single liquid and solid feed supply systems may be provided for such multiple units.

The units may be constructed from any suitable materials e.g. an angle iron framework to which suitable boarding is bolted. It is preferably, however, constructed of a basic slotted framework of e.g. metal or plastic into which can be slotted plastic coated board.

The framework may be a hollow rectangular box with projections at right angles on two, three or four sides as appropriate to form slots for the board to fit into. The framework may be joined at the angles of the unit by cubes having pyramidal projections which fit into the ends of the boxes.

The slotted construction makes for easy assembly and also for easy dismantling if no steps are taken to seal the boards in the slots. Preferably, however, the boards are sealed in the slots for reasons of hygiene, i.e. so that there are no cracks or gaps where liquids or solids could lodge. A suitable sealant may be a polymeric or bituminous adhesive. It may also be possible to use as sealant a suitable inert water-repellent liquid, grease, or gel which is non-adhesive so that gaps and cracks can be sealed without significantly affecting the ease of dismantling. The liquid or grease which may be, for example, a hydrocarbon mineral oil, a polybutene grease, a polybutene-polyethylene copolymer gel or a silicone oil, may contain chemicals to prevent growth of bacteria, viruses or other organism.

The inert water-repellant sealant is preferably a grease or gel having a melting point above ambient, more particularly above 40° C., to minimise leakage. Suitable materials are polybutenes (e.g. various grades of Hyvis sold by BP Chemicals), a polybutene-wax mixture having a melting point above ambient (e.g. Naphthalec C sold by BP Chimie and having a melting point of 90° C.) or a polyethylene dispersed in polybutene also melting above ambient (e.g. Epolene gel sold by BP Chemicals).

In practice the boards are likely to fit relatively loosely in the slots to make for easy assembly and to allow for light swelling or variation in thickness of the boards. In such circumstances it may be convenient, when the boards are sealed into the slots with a inert water-repellant liquid, grease or gel, to hold the boards in the slots and retain the liquid, grease or gel by means of wedges placed between one side of the boards and one side of the slots.

The wedge may be formed of any suitable metal, plastic, wood or paper.

The wedge is preferably inserted on the outside of the rearing unit. The wedges may stand proud of the slot for easy removal or may be flush with the top of the slot and be capped with a suitable length of beading. The board and, if necessary, the wedge may also be held in the slot by screws or bolts. A single wedge may extend the whole length of the slot or a number of smaller wedges may be inserted at intervals along the length of the slot.

The technique of sealing may vary depending on whether the slot is horizontal or vertical.

In the case of a vertical slot, the sealant is preferably applied into the angles of the slot so that when the board is inserted the sealant is forced in the interstices between the board and slot. The wedge is then inserted and driven home and any surplus liquid expelled is wiped off.

A similar technique may be used with horizontal slots except that a thin distance piece may be placed in the centre of the slot before the sealant is applied. This keeps the board off the bottom of the slot and helps to ensure that the sealant is forced up between the sides of the slot and the board.

The sealant may be added to the slots using any convenient dispenser. A particularly convenient form of dispenser is a gun similar to a mastic sealant gun, with the sealant packaged in a disposable cartridge.

A particular advantage of the sealing technique of the present invention is that it allows the use of board which is not impervious at its edges e.g. block board or fibre board which is plastic coated on its top and bottom surfaces but is not plastic coated at its edges. The uncoated edges are in contact with the sealant, which may impregnate the board to some extent. Thus this relatively cheaper form of board can be used without risk of it becoming wet and swelling.

It has been found that boards sealed using the technique described above are firmly held, the thin film of sealant between the slot and the board acting to hold the board. It may, in fact, be necessary to use a gripping tool and some device giving a mechnical advantage (e.g. a jack) to remove the boards. The use of distance pieces in horizontal slots helps to reduce the force needed to remove the boards.

Slots on the framework not used for holding boards can be used as channels for liquid feed lines and can be enclosed by a push fit plastic cover.

The unit is capable of rearing piglets of any weight, preferably from 3 kg, and they may be removed when they have reached a weight of 5 to 8 kg, preferably 6 kg. Thus the unit is capable of rearing all piglets from a litter irrespective of weight at a very early age (e.g. 14 days) and may also be used for rearing orphaned piglets at, possibly, an even earlier age. The normal average age for piglets in this type of unit is from 7 to 20 days and they will normally stay in the unit from 4 to 7 days.

The rearing units described above have been described with particular reference to young piglets and may be referred to as starter units. Thus the liquid feeding device has one or more artificial nipples and dispenses milk. The nest box is also of relatively smaller dimensions than the pen.

Rearing units of the general type described above can, however, be adapted to rear rather older piglets and piglets can, with benefit, be transferred, as they grow, from a starter unit to a follow on unit, each unit being adapted to suit the age and size of the piglets.

In another embodiment, therefore, of the present invention a follow on rearing unit suitable for piglets comprises:

(a) a nest box having a heater to maintain a minimum temperature, preferably a thermostatically controlled heater, and an openable roof, said nest box being of dimensions suitable for housing up to 20 piglets weighing from 5 to 15 kg.

(b) a pen in communication with the nest box having a perforated floor, (c) a water feeding device in the pen, and (d) a solids feed device.

The present invention includes a method of rearing piglets comprising transferring them from a sow to a starter rearing unit as described earlier in this specification and subsequently transferring them to a follow on unit as described immediately above.

The length of time that the piglets spend in each type of unit may vary depending on their size and rate of growth. Preferably piglets are transferred from a starter unit to a follow on unit at a weight of 5-8 kg (e.g. 6 kg.) and they may be transferred out of the follow on unit to a normal pen or run at a weight of 10 to 15 kg (e.g. 13 kg.). Given normal feeding rates and growth the piglets may be in each unit from 4 to 7 days.

The starter and follow on units are, as far as possible similar in design, colour and materials of construction. It has been found that piglets normally take time to adapt to a new environment, but that in transferring from one unit to the second there is very little, if any, disturbance because the piglets recognise the second unit as being essentially the same as the first.

The follow on unit has a larger nest box than the starter unit to allow for the larger size of the piglets and it is preferably about double the size. Thus if the nest box of a first unit is 48 inches long by 24 inches wide by 24 inches high then that of a second unit may be 48 inches long, 48 inches wide and 4 inches high. The nest box is still, however, heated and, preferably, thermostatically controlled by a sensor positioned below a perforated floor of the nest box. The nest box also, desirably, has a vent and fan in a wall or roof and the fan may also be controlled by the temperature sensor and-/or by a humidity sensor. Other features may also be as for the nest box of the starter unit.

The pen of the follow on unit need not be larger than that of the starter unit and is preferably of about the same size. In the follow on unit, the solids feeder is the only source of nutrient, since, as previously indicated, there is only a water supply to the follow on unit. The solids feeder may thus be larger in the follow on unit. It can be either in the nest box or in the pen.

A water feeding device is included in the pen and it may have one or more artificial nipples similar to those supplying milk to the starter unit. However, it may also be a more conventional trough.

The invention is illustrated with reference to the accompanying drawings in which:

FIGS. 1, 2 and 3 are, respectively, a front elevation, a side elevation, and a plan of a single rearing unit for very young piglets (starter unit).

FIG. 4 is a section through a framework for the unit.

Figure 5:
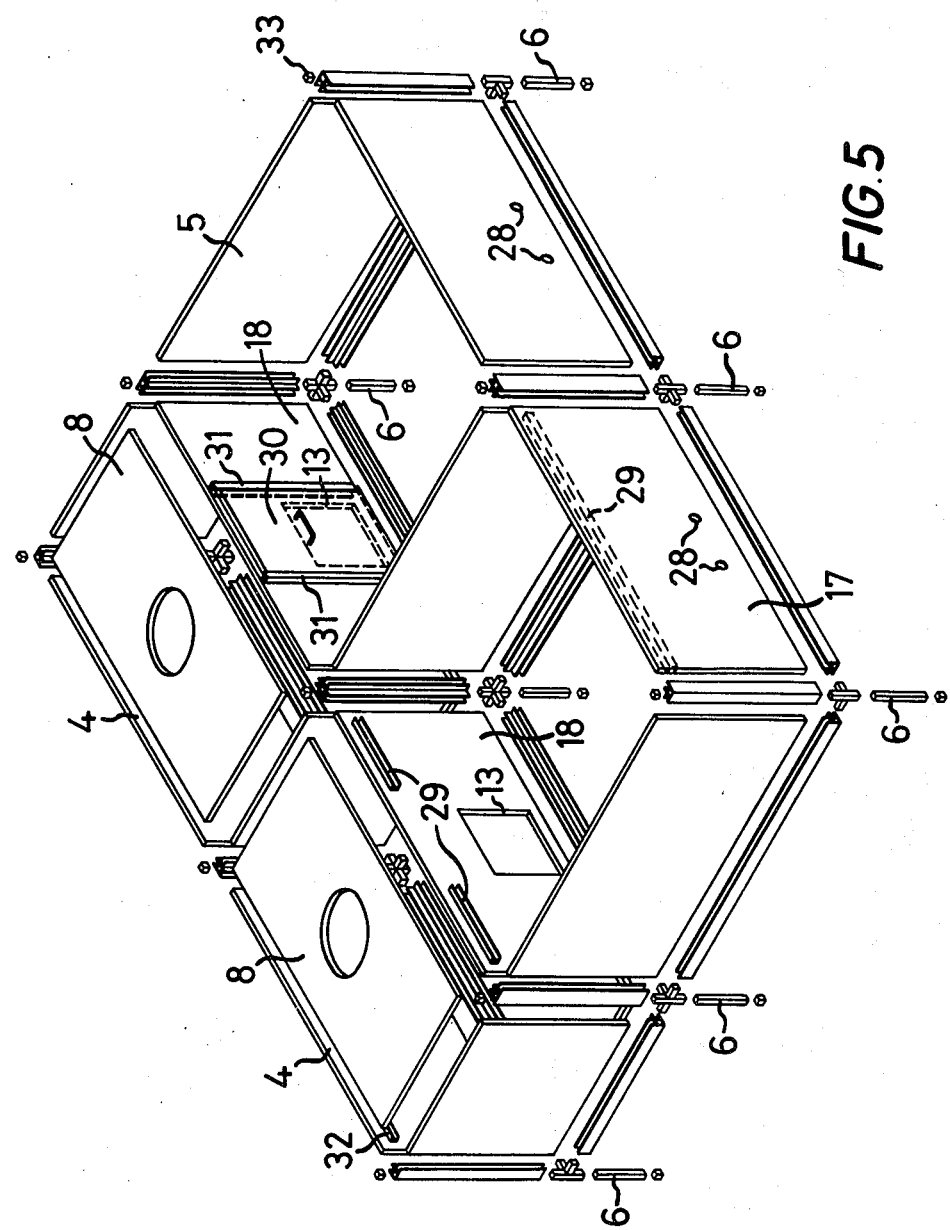
FIG. 5 is an exploded view of a double unit.

In FIGS. 1 to 3, a pig rearing unit comprises a nest box 4 and a pen 5 standing on legs 6. The nest box has dimensions of 48 inches by 24 inches by 24 inches, the pen is 48 inches by 48 inches by 24 inches and the legs are 7 inches high.

The nest box has a solid base 7 and a removable floor 14 formed of epoxy-coated slatted metal with an air gap of ½ inch between base and floor. Since the floor is removable it can be replaced by an alternative floor to give a larger air gap of up to 2 inches.

An opening roof 8 of the nest box is hinged at the side adjacent to the pen and rests on a flange of wall 15. Heater lamp 9 is placed centrally in the roof pointing directly downwards.

The pen has a metal mesh floor 10 and no permanent roof. However, a temporary roof 16 may be placed on suitable flanges on the walls 17, 18 to cover the central portion of the pen.

Both nest box and pen have solid walls. Beneath mesh floor 10 of pen 5 is a slurry collection receptacle 11 sloping from the nest box end to a pipe 12 at the other end. Pipe 12 can be replaced by a hole in the floor of the receptacle with a flanged collar in the hole so that a pipe can be push fitted into the collar and gripped by a ring surrounding the collar.

A doorway 13 connects the nest box and pen, with dimensions of 11 inches by 11 inches.

A temperature sensor is placed between the slatted metal floor 14 and the solid base 7 of the nest box in the position marked at 19, i,e, on the centre line of the opening 13 and 4 inches in from the opening.

Within the pen is a liquid feeding device 20 as described in the drawing accompanying our copending UK Patent Application No. 8120158 Temporary roof 16, if in place, thus covers feeding device 20 and opening 13.

A solids feeding device may be placed in nest box 4 in the position shown at 21. It may be a creep feeder of conventional J-shape but with the trough presenting feed having a cover with 3 circular holes in it of 2 inches diameter.

FIG. 4 is a section through a horizontal framework member at the base of wall 17 along the line X—X of FIG. 1. The member is in the form of a rectangular tube 22 with projections 23,24,25 on three sides. The vertical projections 23 form a slot to hold wall 17, 35 horizontal projections 24 form a slot to hold mesh floor 10, and horizontal projections 25 form a slot in which runs a liquid feed tube 26 leading to feeding device 20. A push-fit plastic cover 27 fits over the slot carrying the feed tube 26.

FIG. 5 shows a double unit with a common central wall. The numerals used are the same as for FIGS. 1 to 4. However, FIG. 5 also shows holes 28 in wall 17 for the liquid feeding trough, flanges 29 on the left hand pen for placing the temporary roof 16, flange 32 for holding the nest box roof 8, and a door 30 sliding in slots 31 for the doorway 13 of the right hand nest box. it is to be understood that parts shown only on one side are present on both sides and are omitted only for convenience of illustration. The framework members are capped throughout, one cap being identified at 33, and in nest box roof 8 holes for the heater are shown rather than the heater itself.

Roof 8 of nest box 5 is formed of 47 mm thick melamine-faced polystyrene board, as is the temporary roof 16 of the pen. The walls of pen and nest box are of 16 mm thick melamine-faced chip or blockboard fitting into 17 mm wide slots.

The heat lamp 9 is of 250–275 watt capacity maintaining a nest box temperature, through sensor 19, of 25° C.

Figure 6:
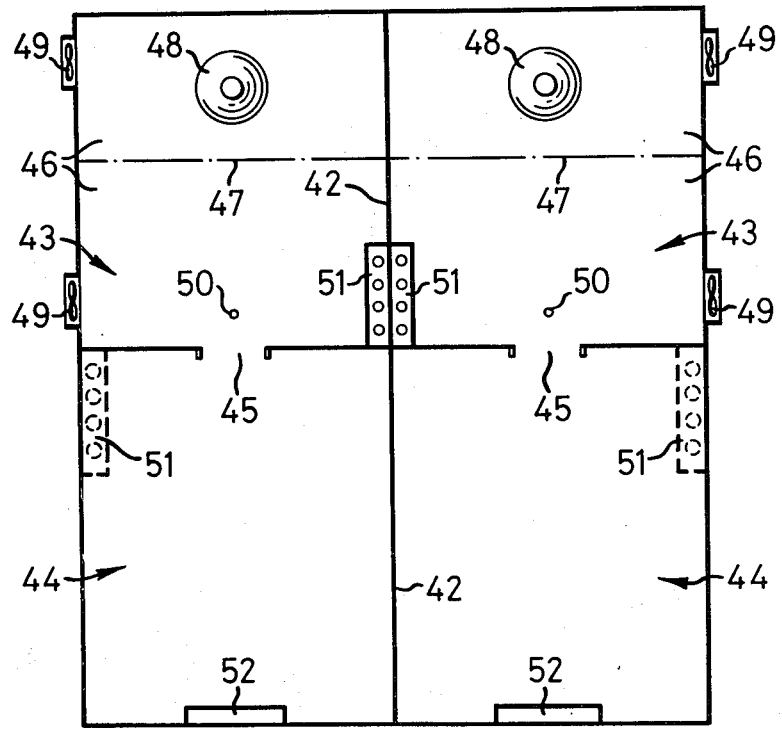
FIG. 6 is a diagrammatic plan view of a double unit for older piglets (follow on unit).

A diagrammatic plan view of a double unit for older piglets is hown in FIG. 6.

FIG. 6 shows a pair of rearing units with a common wall 42. Each unit is made up of a nest 43 and pen 44, with a opening 45 connecting them. Nest box 43 has a roof 46 hinged at 47 and a heater 48 in the roof. Fans 49 are placed in the side walls of the nest box and both heater and fans are controlled by a temperature sensor 50 positioned below a perforated floor of the nest box at 50.

The nest box is 4 ft. by 4 ft. by 2 ft. high.

The pen 4 is 4 ft. by 4 ft. with walls 2 ft. high but has no permanent roof (it can however have a temporary, removeable roof for cold weather). It has a perforated floor with an excrement collecting tray below. A creep feeder 51 is placed in the nest box 43, but, alternatively, the creep feeder 51 may be in the pen 44 at the position shown by dotted lines. The pen has a water feeding trough 52.

We claim:

1. A rearing unit, suitable for piglets, comprising:
   a pen having a perforated floor;
   a liquid feeding device in said pen having at least one artificial nipple;
   a multi-walled nest box adjacent said pen, said nest box having side walls, a top wall and a floor and having an opening in a side wall thereof permitting passage of an animal between the nest box and the pen, said top wall forming an openable roof;
   a heater connected with said nest box for maintaining a minimum temperature within said nest box;
   a thermostat having a temperature sensor positioned in said nest box adjacent to said opening in said side wall and connected to said heater for controlling said heater and thereby controlling the temperature in said nest box; and
   a solids feed device in one of said pen and said nest box and accessible to an animal in said one of said pen and said nest box.

2. A rearing unit as claimed in claim 1 further comprising a fan on a wall of said nest box and wherein said sensor is also connected to said fan for activating said fan to maintain a maximum temperature in the nest box.

3. A rearing unit as claimed in claim 1 wherein said pen has a removable roof which covers only part of the pen but which covers said liquid feeding device and said opening in the side wall of said nest box.

4. A rearing unit as claimed in claim 1 wherein said nest box has a size suitable for housing up to 20 piglets weighing from 5 to 15 Kg.

5. A rearing unit as claimed in claim 1 constructed of spaced frame members having slots therein and wherein at least the walls thereof are plastic coated boards having end portions thereof received in said slots.

6. A rearing unit as claimed in claim 5 wherein the boards are sealed in the slots of the framework by an inert, water-repellent liquid, grease or gel.

7. A rearing unit as claimed in claim 6 wherein the boards are held in the slots, and the inert water-repellent liquid, grease or gel is retained, by means of wedges placed between one side of the boards and one side of the slots.

* * * * *